United States Patent [19]
Pettit et al.

[11] Patent Number: 5,571,484
[45] Date of Patent: Nov. 5, 1996

[54] CATALYTIC CONVERTER HEATER

[75] Inventors: William H. Pettit, Rochester; Kenneth J. Dauer, Avon; James F. Burkhard, Churchville, all of N.Y.; Brian C. Pugh; James R. Finlayson, both of Grand Blanc, Mich.

[73] Assignee: General Motors Corporation, Detroit, Mich.

[21] Appl. No.: 428,746

[22] Filed: Apr. 25, 1995

[51] Int. Cl.⁶ ...................................................... F01N 3/20
[52] U.S. Cl. .......................... 422/173; 422/171; 422/177; 422/198; 422/211; 422/182; 422/183; 60/303; 60/286; 60/748
[58] Field of Search ..................................... 422/168, 172, 422/171, 182, 173, 183, 177, 198, 211; 60/274, 286, 303, 748; 123/447, 467; 239/399, 403

[56] References Cited

U.S. PATENT DOCUMENTS

| | | | |
|---|---|---|---|
| 5,339,630 | 8/1994 | Pettit | 60/303 |
| 5,353,590 | 10/1994 | Pettit et al. | 60/274 |
| 5,353,591 | 10/1994 | Kabasin et al. | 60/274 |
| 5,408,970 | 4/1995 | Burkhard et al. | 123/447 |

*Primary Examiner*—Robert J. Warden
*Assistant Examiner*—Hien Tran
*Attorney, Agent, or Firm*—Cary W. Brooks

[57] ABSTRACT

A burner type catalytic converter heater composed of an air intake housing having a peripheral mounting flange for universal mounting to an exhaust system upstream of the catalytic converter. A nozzle body is provided having a central portion whereat an orifice delivers atomized fuel and an annular flange portion which interfaces with the air intake housing to define an air intake chamber on an upstream side thereof. A cylindrical combustion chamber housing is provided and a single-stage vortex body is connected to one end of the combustion chamber housing, wherein vanes of the vortex body adjoin a downstream side of the annular flange portion.

11 Claims, 4 Drawing Sheets

CATALYTIC CONVERTER HEATER

BACKGROUND OF THE INVENTION

1. Field of the Invention

The present invention relates to devices for preheating internal combustion engine exhaust gases before the gases reach the catalytic converter during and shortly after a cold engine start. More particularly, the present invention relates to a catalytic converter heater having a simplified structure and improved performance.

2. Description of the Prior Art

The exhaust system of internal combustion engines include a catalytic converter which uses a catalytic reaction to reduce harmful pollutants of the exhaust gas, including hydrocarbons (HC), carbon monoxide (CO), and nitrogen oxides ($NO_x$) before the exhaust gas reaches the atmosphere. However, the catalyst in the catalytic converter will react with the exhaust gas so as to properly remove pollutants therefrom only after it has attained a minimum "light-off" temperature, typically in the range between 350 and 450 degrees Centigrade. Following the initial phase of engine operation, the exhaust gas will supply sufficient heat to maintain the catalyst above the light-off temperature. However, during the initial phase of engine operation, defined as the time period between a cold start and the catalyst reaching the light-off temperature, the exhaust gas is insufficiently hot to raise the catalyst to the light-off temperature. The initial phase of engine operation can be in the range of 75 to 100 or more seconds, depending on the ambient temperature, design of the engine, and driving conditions. Accordingly, during the initial phase of engine operation, harmful pollutants of the exhaust gases may be released to the atmosphere.

In order to minimize release of harmful pollutants of the exhaust gas to the atmosphere during the initial period of engine operation, it is desirable to raise the temperature of the catalyst as quickly as possible to the light-off temperature. Since the exhaust gas during the initial phase of engine operation has insufficient heat for this purpose, a secondary source of heat must be introduced into the catalytic converter.

There are two basic technologies for providing supplemental heat to a catalytic converter during the initial phase of engine operation. One technology uses an electrical heater for heating internal members of the catalytic converter. This system requires a large electrical power drain on the electrical system of the internal combustion engine in order that sufficient heat be delivered in a small time period. The other technology uses a burner located in the exhaust system upstream of the catalytic converter to thereby augment the temperature of the exhaust gases entering into the catalytic converter. This system uses the fuel of the internal combustion engine as its source of fuel. Burner systems are favored (although not universally, of course) over electrical systems because they deliver higher levels of heat with greater efficiency.

An example of a catalytic converter heater operating on the burner principle is described in U.S. Pat. No. 5,339,630, which is assigned to the assignee hereof.

In the catalytic converter heater described in the aforementioned patent, a combustor head assembly is provided having means for mixing fuel and air, and a source of ignition is provided for the fuel and air mixture. A charge preparation assembly within the combustor head comprises a two-stage vortex which cooperates with a fuel nozzle to atomize the fuel and combine it with air to thereby produce a fuel and air mist. The fuel and air mist is subsequently injected into a combustor including an elongated tubular combustor chamber having the combustion head assembly at a first end and a series of louver or round outlets, placed circumferentially at its opposite end to promote mixing of the burner output with the exhaust gases from the internal combustion engine.

The combustor is mounted within a burner housing. An interlocking flange assembly retains the combustor and the burner together as a single unit. Exhaust gas enters the housing through an inlet adjacent to the combustor outlets such that exhaust gas entering the burner housing passes over the exterior of the combustor and past the louvered outlets to maximize heat retrieval. Dilution air, which may be required to complete combustion of the burner fuel and to assure maximum conversion efficiencies in the catalytic converter during the initial phase of engine operation, is added to the exhaust gas at a location upstream of the combustor so as to encourage mixing of the dilution air with the exhaust gas prior to heating by the burner.

The burner assembly is operably connected, preferably integrally with the exhaust system, to a catalytic converter with the exit lying in close or adjacent proximity to the inlet of the converter, in order to reduce the size of the assembly and limit heat loss between the burner and the catalytic converter.

While the hereinabove described catalytic converter heater serves to provide heating of the exhaust gases of an internal combustion engine, there still remains a need in the art to provide a catalytic converter heater which is of simplified construction, thereby providing the benefits of reduced weight, size, cost and manufacturing complexity, while yet providing optimal operational characteristics. Still needed in the art, too, is a catalytic converter heater which is structured for being universally installable with any exhaust system.

SUMMARY OF THE INVENTION

The present invention is a burner type catalytic converter heater having a simplified structure, optimal operational characteristics, and universal applicability.

The catalytic converter heater according to the present invention is composed of an air intake housing having a peripheral mounting flange for universal mounting to an exhaust system upstream of the catalytic converter, a nozzle body having a central portion whereat an orifice delivers atomized fuel and an annular flange portion which interfaces with the air intake housing to define an air intake chamber on an upstream side thereof, a cylindrical combustion chamber housing, a vortex body connected with one end of the combustion chamber housing, wherein vanes of the vortex body adjoin a downstream side of the annular flange portion. The annular flange portion of the nozzle body is provided with a plurality of elongated combustion air holes, wherein combustion air, which is a portion of the intake air, enters the intake air chamber, passes through the elongated combustion gas holes, swirls through the vanes and enters into a mixing chamber formed by the vortex body adjacent the orifice. Atomized fuel enters into the mixing chamber via the orifice and thereupon forms a mist with the swirling combustion air. The mist passes through a vortex opening into a frustoconical outlet formed in the vortex body, and then enters into a combustion chamber defined by the combustion chamber housing. A spark plug protrudes into the combustion chamber to thereby provide a source of ignition of the mist. The annular flange portion is further provided with circumferentially placed and regularly spaced dilution air holes, through which dilution air, which is a portion of the intake air, flows past the exterior side of the combustion chamber housing, thereby cooling it and adding air to the combustion gas exiting of the combustion chamber.

The hot combustion gas and dilution air are delivered into the exhaust system, whereupon they mix with the exhaust gas from the internal combustion engine. The combustion chamber is located a preselected distance upstream from the catalytic converter, wherein the space therebetween provides a reaction volume. The reaction volume provides time for oxidation of HC and CO, each of which having finite oxidation reaction times. Accordingly, exhaust pollutants mixing with the combustion gas and dilution air from the catalytic converter heater serve to provide even greater heat energy as they oxidize, while at the same time reducing the presence of these pollutants.

Because the catalytic converter heater is constructed as a cartridge which allows for removable installation to an exhaust system, it has universal applicability and ease of servicing. Further because of its simplified construction and single stage vortex, fabrication and assembly steps are minimized, as are its cost, size and weight.

Accordingly, it is an object of the present invention to provide a catalytic converter heater having a simplified construction and universal applicability to internal combustion exhaust systems.

It is an additional object of the present invention to provide a catalytic converter heater which has a simplified and optimized structure for providing fuel and air mixing prior to combustion thereof.

It is an another object of the present invention to provide a catalytic converter heater which provides a reaction volume upstream of the catalytic converter for providing optimized oxidation of exhaust pollutants.

It is a further object of the present invention to provide a catalytic converter heater which provides bypass air for both cooling and for downstream reaction with combustion gas from the heater and from the exhaust gases of the internal combustion engine in advance of the catalytic converter.

It is yet an additional object of the present invention to provide a catalytic converter heater which has an improved fuel delivery structure which serves to atomize the fuel at an orifice for mixing with combustion air.

It is yet a further object of the present invention to provide a catalytic converter heater which has an improved air flow therethrough, wherein losses are reduced, air is better distributed, and pressure differentials are less.

It is yet another object of the present invention to provide a catalytic converter heater which is less expensive, smaller and lighter than prior art catalytic converter heaters.

These, and additional objects, advantages, features and benefits of the present invention will become apparent from the following specification.

DETAILED DESCRIPTION OF THE PREFERRED EMBODIMENT

Figure 1:
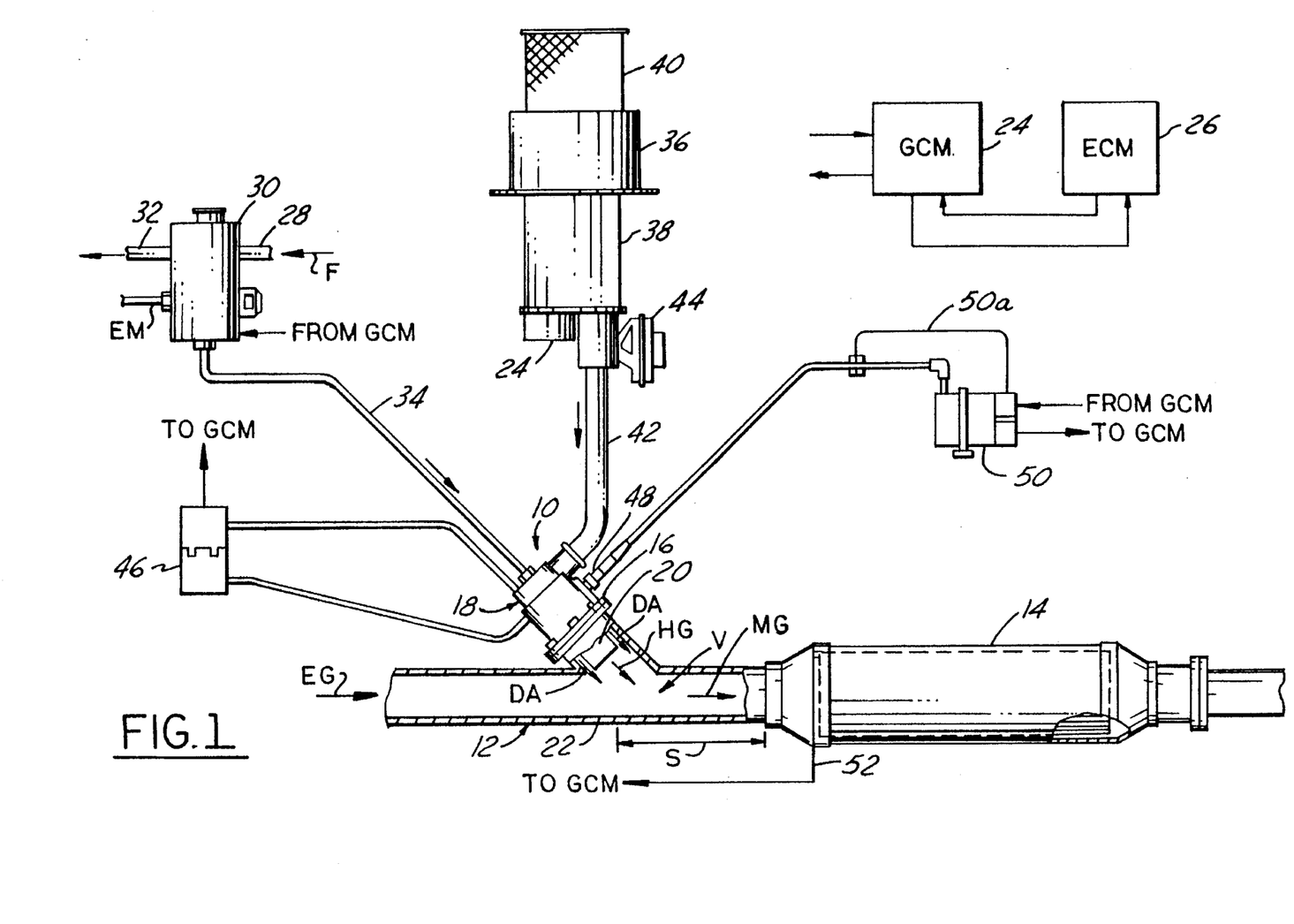
FIG. 1 is a schematic view of a relevant portion of an internal combustion engine system, wherein the catalytic converter heater according to the present invention forms a part.
Figure 2:
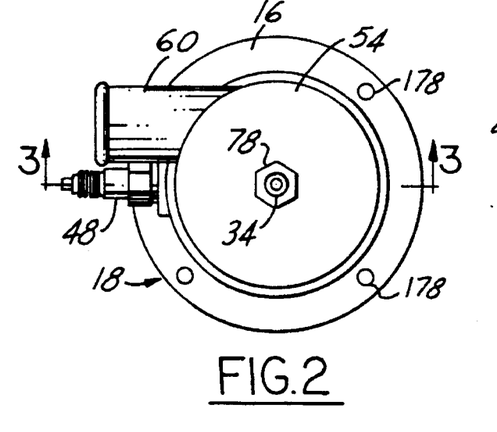
FIG. 2 is a top plan view of the catalytic converter heater according to the present invention.

Referring now to the Drawing, FIG. 1 depicts a schematic of an exemplary automotive environment of use of the catalytic converter heater 10 according to the present invention.

The catalytic converter heater 10 is connected with an exhaust system 12 upstream of the catalytic converter 14. The catalytic converter heater 10 has a cartridge configuration which allows for it being removably connected to a fitting of the exhaust pipe 22 of the exhaust system 12 via bolting at a mounting flange 16 connected with an air chamber housing 18 thereof. A combustion chamber housing 20 of the catalytic converter heater 10 projects into the exhaust system 12 so that heater combustion gas HG from the catalytic converter heater will mix with upstream exhaust gas EG. In this regard, the combustion chamber housing 20 is separated from the catalytic converter 14 a distance S which thereby provides a reaction volume V wherein pollutants are further oxidized during the travel time therethrough in advance of reaching the catalytic converter. Accordingly, not only is the mix gas MG (composed of exhaust gas EG from the engine and of the heater combustion gas HG and dilution air DA from the catalytic converter heater 10) raised to the light-off temperature required for proper operation of the catalyst of the catalytic converter 14, but pollutants present in the mix gas are reduced in advance of entry into the catalytic converter.

Operation of the catalytic converter heater 10 is controlled by a heater control module (GCM) 24 in conjunction with the engine control module (ECM) 26. A description of a suitable control is described in U.S. Pat. No. 5,353,591, issued on Oct. 11, 1994, and which is assigned to the assignee hereof.

A fuel tank line 28 from the vehicle fuel tank (not shown) is connected with a fuel supply and purge block (FS/PB) 30. The FS/PB 30 conveys fuel F to an engine fuel supply line 32 that connects with the engine (not shown) and also meters fuel to a heater fuel supply line 34 that connects to the catalytic converter heater 10. The FS/PB 30 not only serves to meter an appropriate fuel rate to the catalytic converter heater 10, it further serves to purge fuel from the heater fuel supply line 34 and the catalytic converter heater 10 via an engine intake manifold vacuum line EM when the catalytic converter heater is shut-off. Fuel metering and purging functions of the FS/PB 30 are controlled by the GCM 24. A further description of a suitable electronically controlled fuel flow system is disclosed in U.S. patent application 08/236, 980 which is assigned to the assignee hereof.

Atmospheric air for the catalytic converter heater 10 is provided by a blower 36 powered by a motor 38. The air first passes through a filter 40 and then subsequently passes along an intake conduit 42 to the air chamber housing 18. A check valve 44 prevents exhaust gas from exiting the air filter when the blower 36 is not in operation. The GCM 24 controls the function of the motor 38, and the check valve 44 is controlled by upstream blower pressure. In this regard, a pressure sensor 46 senses the pressure differential between the air in the combustion chamber housing 20 and the gas in the reaction volume V external to the combustion chamber housing 20 and sends a signal to the GCM to regulate current to the motor 38 to thereby adjust the blower speed so that an appropriate air flow is maintained for optimum fuel burning in the combustion chamber housing 20. The pressure differential signal is also used by the GCM 24 to provide an optimum fuel flow rate to the catalytic converter heater 10 via the FS/PB 30. Alternatively to the pressure sensor, an airflow sensor can be used.

Internal to the catalytic converter heater 10, the fuel is atomized and mixed with the air. The air and atomized fuel form a mist within the combustion chamber housing 20 which is then ignited via a spark plug 48 having an electrode end situated inside the combustion chamber housing 20. A coil 50 supplies spark voltage for the electrode of the spark plug 48. The preferred spark plug 48 has center and outer electrodes made of high temperature alloy (Haynes 214), a stainless 409 shell, and a high temperature anti-seize coating on the threads; the outer electrode is heli-arc welded to the shell. The coil 50 is controlled by the GCM 24 and is provided with a flame detection circuit 50a so that the GCM can regulate air and fuel enrichment during "start mode" of operation, and also detect flameout. The spark plug continues to deliver sparking to provide flame detection at all times during combustion of the fuel-air mist, wherein initial flame detection is used to switch from the "start mode" of operation to a "run mode" of operation.

A temperature sensor 52 located at the catalytic converter 14 provides the GCM 24 with information on when to switch on and switch off the catalytic converter heater 10 based upon the operating temperature of the catalytic converter.

Referring now to FIGS. 2 through 10, the structure and function of the catalytic converter heater 10 will be detailed.

Figures 3, 11, 12:
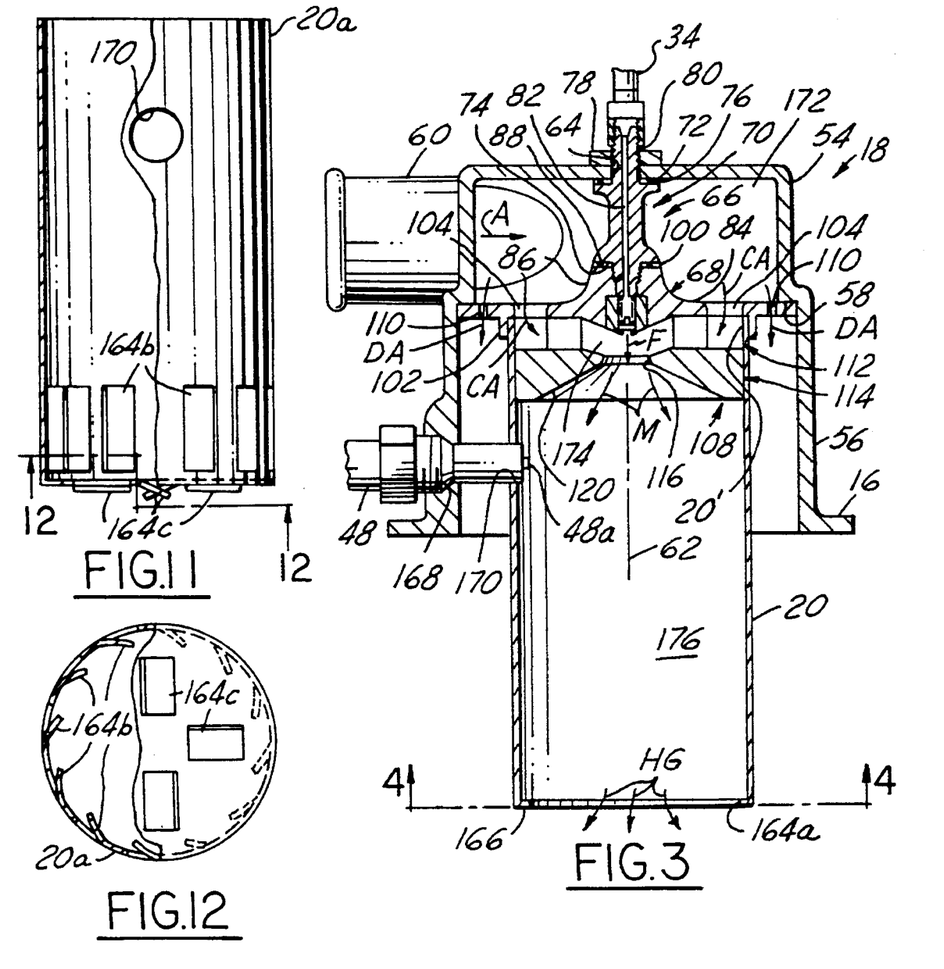
FIG. 3 is a partly sectional side view of the catalytic converter heater according to the present invention, seen along line 3—3 in FIG. 2.
FIG. 11 is a partly sectional side view of a combustion chamber housing having an alternative aperture configuration.
FIG. 12 is a partly sectional end view of the combustion chamber housing of FIG. 11, seen along line 12—12 in FIG. 11.

As best shown by FIG. 3, the catalytic converter heater 10 is divided into two chambers: the aforementioned air chamber housing 18 and combustion chamber housing 20. The air chamber housing 18 is characterized by an enclosure 54 and a casing 56 to which is connected the aforementioned mounting flange 16. The enclosure 54 and the casing 56 are demarcated by an annular offset 58. The air intake conduit 42 connects with an air inlet 60 located on the enclosure 54 perpendicularly to the centerline axis 62 of the air chamber housing 18.

Figures 5, 6, 7, 8, 9, 10:
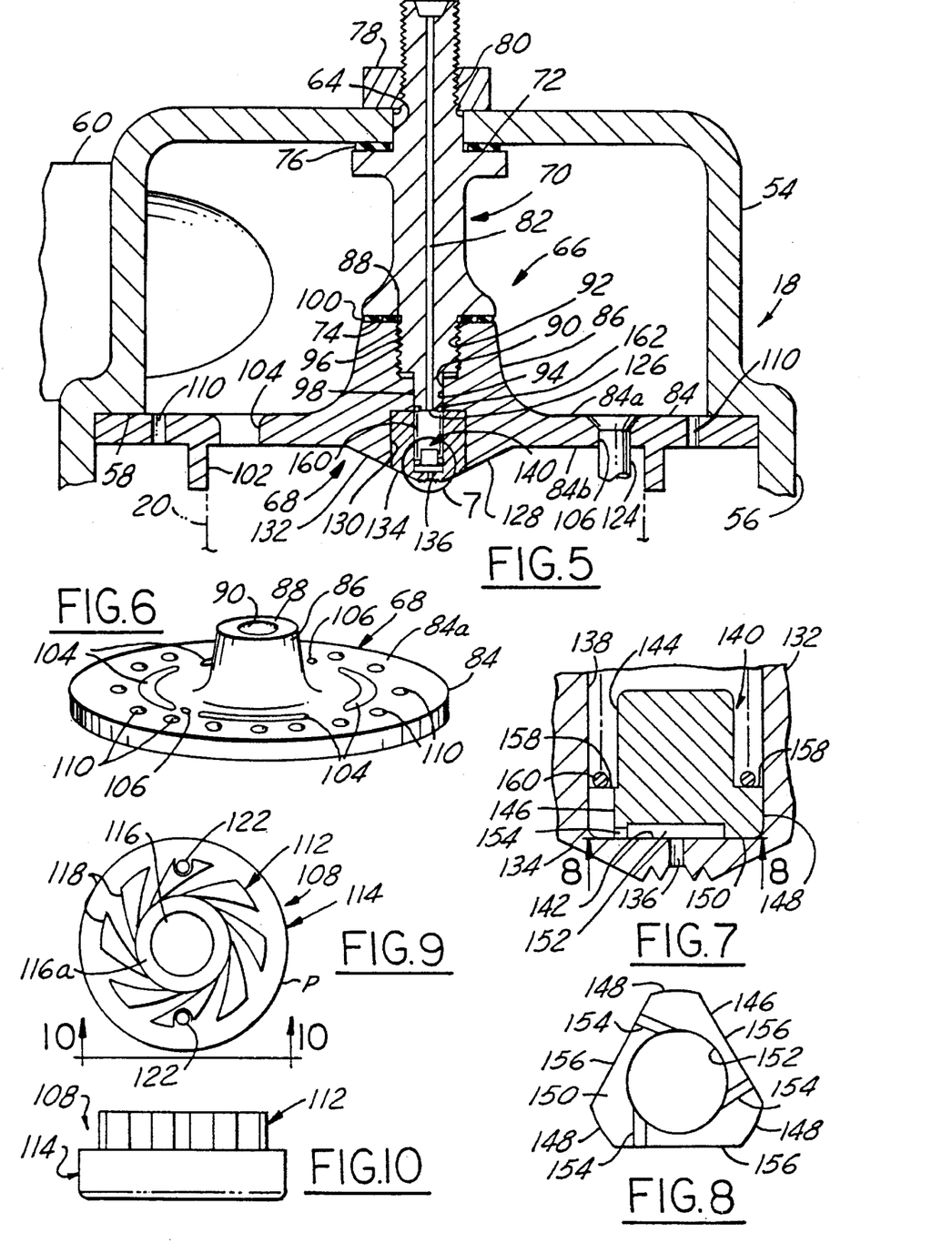
FIG. 5 is a detail, broken-away, partly sectional side view of the catalytic converter heater according to the present invention, showing in particular the air intake chamber thereof.
FIG. 6 is a perspective view of a nozzle body of the catalytic converter heater according to the present invention.
FIG. 7 is a detail, broken-away, partly sectional side view of a central portion of the nozzle body of the catalytic converter heater according to the present invention, seen at circle 7 in FIG. 5, and showing in particular a fuel orifice and a fuel director thereof.
FIG. 8 is a bottom plan view of the fuel director of the catalytic converter heater according to the present invention, seen along line 8—8 in FIG. 7.
FIG. 9 is a top plan view of the vortex body of the catalytic converter heater according to the present invention.
FIG. 10 is a side view of the vortex body, seen along line 10—10 in FIG. 9.

On the centerline axis 62, the enclosure 54 is provided with a hole 64 for mounting thereto a fuel nozzle assembly 66. The fuel nozzle assembly 66 includes a nozzle body 68 and a nozzle holder 70 which are threadingly connected together, as best seen in FIGS. 3 and 5.

The nozzle holder 70 has an upper shoulder 72 and a lower shoulder 74. The upper shoulder 72 is separated from the air chamber housing 18 by a gasket 76, and is sealingly pressed against, and thereby mounted to, the air chamber housing via a nut 78 threadingly engaged with a threaded connector end 80 of the nozzle holder 70. The threaded connector end 80 is connected with the heater fuel supply line 34 from the FS/PB 30. The nozzle holder 70 has a fuel passageway 82 thereinside which is concentric with the centerline axis 62.

The nozzle body 68 is integrally composed of an annular flange portion 84 and a central portion 86. The annular flange portion 84 has an upstream side 84a and a downstream side 84b (see FIG. 5). At the upstream side 84a of the annular flange portion 84, the central portion 86 has a shoulder 88 and a two-step bore 90. The two-step bore 90 is composed of a threaded first bore 92 and a narrower second bore 94. Projecting from the lower shoulder 74 of the nozzle holder 70 is a threaded first segment 96 and a narrower second segment 98. The second segment 98 is received into the second bore 94, and the first segment 96 is threadingly engaged with the first bore 92, as best shown in FIG. 5. A sealing gasket 100 is located between the shoulder 88 and the lower shoulder 74.

The upstream side 84a of the annular flange portion 84 peripherally abuts the annular offset 58 of the air chamber housing 18, and is held thereat by the aforementioned nut 78 which is threadingly engaged on the threaded connector end 80 of the nozzle holder 70. An annular lip 102 is located on the downstream side 84b of the annular flange portion 84. The combustion chamber housing 20 abuttably seats with respect to the annular flange portion 84 and the annular lip 102.

A plurality of elongated combustion air holes 104 are formed in the annular flange portion 84 adjacent the annular lip 102 so as to provide communication between the air chamber housing 18 and the combustion chamber housing 20. Further, a plurality of regularly spaced apart vortex bolt holes 106 are provided in the annular flange portion 84 for connecting a single-stage vortex 108 thereto, the vortex being described hereinbelow. Finally, a plurality of dilution air holes 110 are formed in the annular flange portion 84 so as to provide communication between the air chamber housing 18 and a dilution air space formed between the casing 56 and the combustion chamber housing 20.

As best seen in FIG. 6, the preferred annular flange portion 84 is provided with four equally spaced apart, curved combustion air holes 104, two diametrically opposed vortex bolt holes 106 and on the order of twelve regularly spaced apart dilution air holes 110. The relative area of the combustion air A holes 104 and the dilution air holes 110 is predetermined such that a selected portion of air from the air chamber housing will exit therethrough, respectively, depending upon desired operational characteristics of the catalytic converter heater 10 for general use in any exhaust system or for particular use in selected exhaust system.

The above mentioned vortex 108 includes a vane component 112 and a base component 114, wherein a vortex opening 116 is axially located collectively therethrough. The vane component 112 is provided with a plurality of vanes 118, preferably on the order of 8 in number, which have a pinwheel arrangement centered on an annular bevel 116a of the vortex opening 116, as shown in FIG. 9. The vanes 118 are recessed from the perimeter P of the vortex 108. The base component 114 has a frustoconical outlet 120 (see FIG. 3) which communicates with the vortex opening 116. A plurality of threaded vortex bolt holes 122 are provided in the vortex, each of which being aligned, respectively, with a vortex bolt hole 106. As shown collectively by FIGS. 3, 5 and 9, a vortex bolt 124 is placed into each vortex bolt hole 106 and threadably engaged with its respective threaded vortex bolt hole 122, thereby affixing the vortex 108 to the downstream side 84b of the annular flange portion 84 of the fuel nozzle assembly 66.

As shown in FIG. 3, the combustion chamber housing 20 receives the vortex 108 at the upstream end 20' thereof. The combustion chamber housing 20 is then spot welded to the base component 114 of the vortex 108, whereupon connection of the vortex to the annular flange portion 84, attendantly connects the combustion chamber housing 20 to the air chamber housing 18.

Returning again to the fuel nozzle assembly 66, the structure for providing atomization of the fuel from the FS/PB 30 will now be detailed.

As best seen in FIGS. 5, 7 and 8, the fuel passageway 82 within the nozzle holder 70 extends to the end 126 thereof. A gently sloping conical projection 128 is formed at the downstream side 84b at the central portion 86 concentric with the centerline axis 62. A seat 130 is provided in the central portion 86 of the nozzle body 68 concentric with the centerline axis 62, wherein the seat communicates with the second bore 94, and consequently, the fuel passageway 82.

An insert 132 is dimensioned for being press-fit into the seat 130. The insert 132 has a conically shaped end 134 which matches the slope of the conical projection 128, the apex of which is provided with an orifice 136. A pocket 138 is formed in the insert 132 which communicates with the orifice 136 and the fuel passageway 82. A fuel director 140 is located within the pocket 138 and rests upon a floor 142 formed at the terminus of the pocket whereat the orifice 136 is situated.

As best seen in FIGS. 7 and 8, the fuel director 140 has a cylindrical segment 144 and a triangular segment 146 having radiused corners 148 for abutting the pocket 138. The foot end 150 of the triangular segment 146 is provided with a cylindrical sink 152 and a plurality of grooves 154, wherein each groove extends from a respective side 156 of the triangular segment 146 to the cylindrical sink. Each of the radiused corners 148 provides a shelf 158 adjacent the cylindrical segment 144. A spring 160 rests upon the shelves 158 and extends upwardly therefrom concentrically with respect to the cylindrical segment 144.

Assemblage of the fuel nozzle assembly 66 will now be briefly detailed. Insert 132 is press-fit into the seat 130. The fuel director 140 is placed into the pocket 138 so that the foot end 150 faces the floor 142, and one end of the spring 160 is placed on the shelves 158. Now, the first and second segments 96, 98 are received into the double-step bore 90, wherein the first segment 96 is threadably engaged with respect to the first bore 92, and wherein the gasket 100 provides a seal therebetween. As a consequence, the spring 160 engages an annular peripheral slot 162 formed at the end 126 of the second segment 98 and compresses with respect to the shelves 158, thereby causing the foot end 150 of the fuel director 140 to abut against the floor 142 of the pocket 138. Thereafter, the vortex bolts 124 secure the vortex 80 to the annular flange portion 84, wherein the combustion chamber housing 20 is seated at the annular lip 102. Lastly, the nut 78 secures the annular flange portion 84 against the annular offset 58, to thereby connect the air chamber housing 18 to the combustion chamber housing 20.

Figure 4:
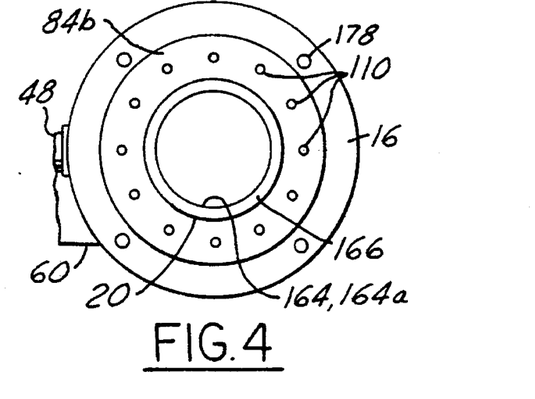
FIG. 4 is a bottom plan view of the catalytic converter heater according to the present invention, seen along line 4—4 in FIG. 3.
Figures 13, 14, 15, 16, 17:
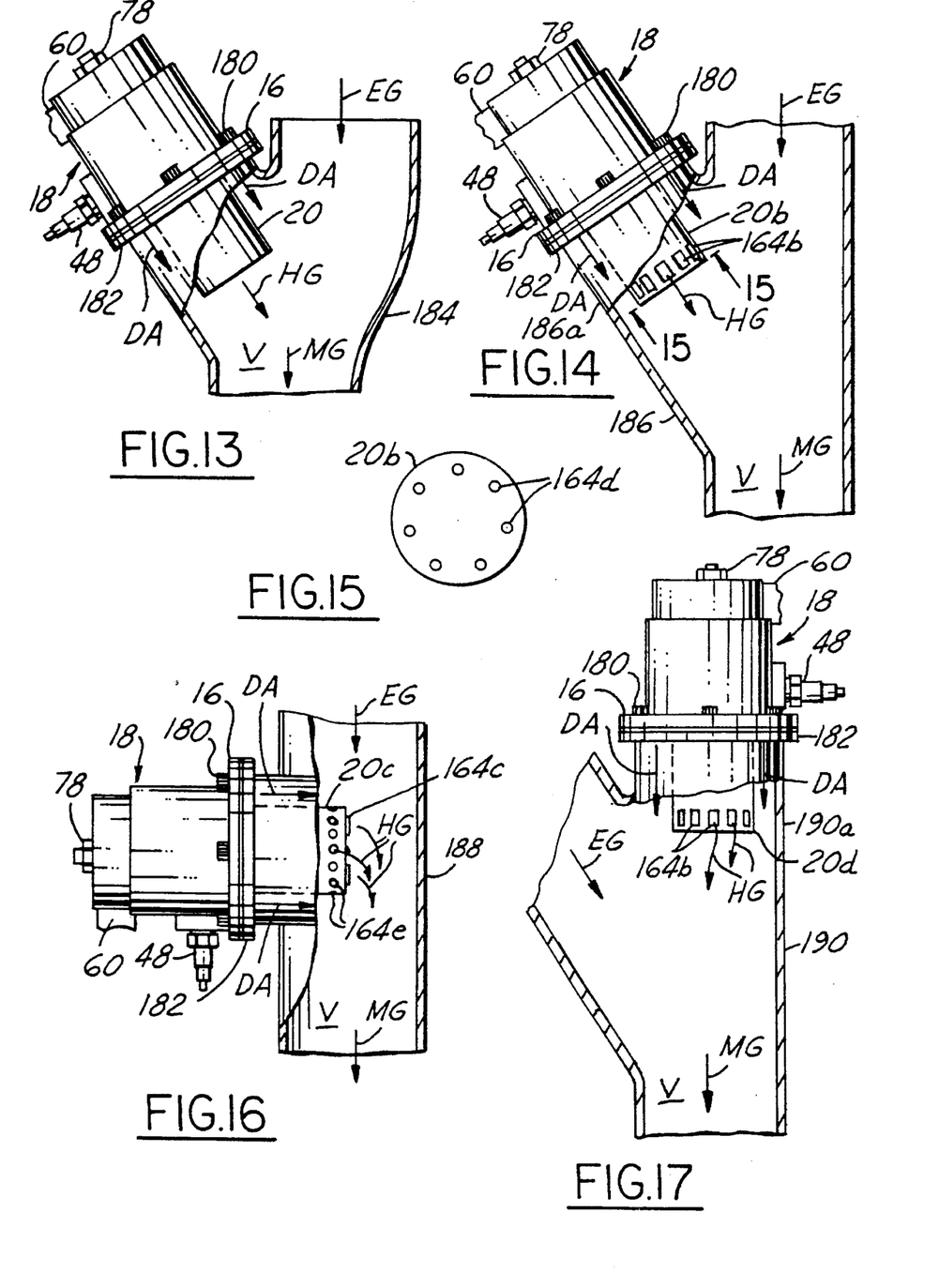
FIG. 13 is a partly sectional side view showing the catalytic converter heater according to the present invention installed with respect to a Y-fitting of an exhaust system.
FIG. 14 is a partly sectional side view showing the catalytic converter heater according to the present invention installed with respect to the off-line port of a branch-fitting of an exhaust system.
FIG. 15 is a bottom plan view of the combustion chamber housing of the catalytic converter heater, seen along line 15—15 in FIG. 14.
FIG. 16 is a partly sectional side view showing the catalytic converter heater according to the present invention installed with respect to a T-fitting of an exhaust system.
FIG. 17 is a partly sectional side view showing the catalytic converter heater according to the present invention installed with respect to the in-line port of a branch-fitting of an exhaust system.

As depicted in FIGS. 3 and 4, the combustion chamber housing 20 is cylindrical and is preferably composed of a Hastelloy X material, although other alloys may also be used. The combustion chamber housing 20 is provided with at least one aperture 164 remotely spaced from the vortex 108. Preferably, as shown in FIGS. 4 and 13, a single aperture 164a is formed on a bottom wall 166 centrally disposed on the centerline axis 62. However, other aperture configurations are possible, including louvers or holes circumferentially disposed in the bottom wall, as well as louvers or holes formed in the combustion chamber housing adjacent the bottom wall. In this regard, FIGS. 11 and 12 depict a combustion chamber housing 20a having louvers 164b, 164c; FIGS. 14 and 15 depict a combustion chamber housing 20b having louvers 164b and holes 164d; FIG. 16 depicts a combustion chamber housing 20c having holes 164e and louvers 164c; and FIG. 17 depicts a combustion chamber housing 20d having louvers 164b.

As shown in FIG. 3, the aforementioned spark plug 48 threadably engages a threaded seat 168 formed in the casing 56 of the air chamber housing 18 and the electrode end 48a thereof projects through an access port 170 formed in the combustion chamber housing 20, wherein the electrode end is fixedly located within the combustion chamber housing. In this regard, the location of the electrode end 48a of the spark plug 48 is situated spaced from the vortex 108 so that it is downstream of the pressure drop therefrom, wherein gas flow through the access port 170 is minimized, resulting in improved ignition and better flame detection.

It will be noticed from FIG. 3 that there are three chambers: an air chamber 172 formed within the air chamber housing 18 at the upstream side 84a of the annular flange portion 84 of the nozzle body 68, a mixing chamber 174 formed by the vanes 118 coaxial with respect to the vortex opening 116 and the orifice 136, and a combustion chamber 176 formed within the combustion chamber housing 20.

Operation of the catalytic converter heater according to the present invention will now be detailed with reference being directed to FIGS. 1 through 10.

Upon a cold engine start, the GCM 24 starts the motor 38 thereby causing the blower 36 to provide a positive air pressure within the air chamber 172. In this regard, the inlet

60 is oriented tangentially with respect to the enclosure 54 and parallel with respect to the annular flange portion 84; as a result, air A enters into the air chamber in a swirling movement already anticipating the added swirl that will be caused by the vanes 118. The air A passes through both the combustion air holes 104 and the dilution air holes 110. The combustion air CA passes through the combustion air holes 104, and is then directed by the base component 114 of the vortex (where the vanes are recessed from the perimeter thereof) into the vane component 112, whereupon it is diverted into the pinwheel pattern of the vanes 118 which causes the combustion air to enter into the mixing chamber 174 with a high velocity swirl.

The GCM commences delivery of fuel F to the fuel nozzle assembly 66 via the FS/PB 30. In this regard, fuel passes through the fuel passageway 82, through the spring 160, which acts as a fuel filter, through the grooves 154 in the fuel director 140 into the cylindrical sink 152 and thereupon atomizes out through the orifice 136. The fuel, now atomized by action of the fuel nozzle assembly, exits the orifice and immediately encounters the fast moving and swirling combustion air CA in the mixing chamber 174, whereupon it homogeneously mixes therewith to form a fine mist M. The mist then passes through the vortex opening 116 and rapidly expands while passing through the frustoconical outlet 120.

The GCM provides a spark at the spark plug 48 via the coil 50 whereupon the mist is ignited. The air and fuel enrichment for the "start mode" of operation converts to that for the "run mode" of operation upon initial flame detection. Heater combustion gas HG now exits the combustion chamber housing via the at least one aperture 164, to thereupon mix with exhaust gas EG.

Meanwhile, the dilution air DA passes along the outside of the combustion chamber housing, thereby cooling it and eventually mixing with the exhaust gas EG and the heater combustion gas HG. The dilution air DA provides oxygen for further oxidation of pollutants present in the exhaust gas EG and the heater combustion gas HG. Accordingly, the resulting mix gas MG experiences pollutant oxidation while passing through the reaction volume V. Accordingly, by the time the mix gas MG reaches the catalytic converter 14 it has a reduced pollutant level and it is hotter (for example on the order of 700 degrees Centigrade) than the light-off temperature (for example on the order of 400 degrees Centigrade) for the catalyst of the catalytic converter whereby a fast rate of heat transfer from the mix gas to the catalyst is provided.

The proper fuel and air ratio for optimum combustion within the combustion chamber 176 is maintained by pressure differential information supplied by the pressure sensor 46 to the GCM 24.

When the temperature sensor 52 detects that the temperature of the catalytic converter is such that exhaust gas alone is sufficient to maintain the light-off temperature, the GCM stops fuel delivery to the nozzle assembly 66 via the FS/PB 30. Once all fuel has burned, the GCM turns off the motor 38 and, via the FS/PB 30, causes the engine intake manifold vacuum pressure to communicate with the heater supply line 34 via the engine intake manifold line EM to thereby suckingly purge all fuel therefrom and from the fuel nozzle assembly 66 so that no fuel can exit into the exhaust gas. Thereafter, the GCM shuts off the heater line 34 from the engine intake manifold line.

FIGS. 13 through 17 depict typical examples of installation configurations for the catalytic converter heater according to the present invention. In each case, the mounting flange is provided with a plurality of mounting holes 178 through which mounting bolts 180 pass. In this regard, the exhaust system to which the catalytic converter heater 10 is to be installed is provided with a reciprocal mounting flange 182 having holes aligned with the mounting holes 178 and through which the mounting bolts also pass to thereby sealingly mount the catalytic converter heater 10 to the exhaust system in a selectively removable manner.

FIG. 13 depicts the catalytic converter heater according to the present invention mounted with respect to a Y-fitting 184. FIGS. 14 and 15 depict the catalytic converter heater according to the present invention mounted to an off-line port 186*a* of a branch-fitting 186. FIG. 16 depicts the catalytic converter heater according to the present invention mounted to a T-fitting 188. Finally, FIG. 17 depicts the catalytic converter heater according to the present invention mounted to an in-line port 190*a* of a branch-fitting 190.

It will be readily seen from the foregoing description, that the catalytic converter heater according to the present invention has a number of significant advantages over the prior art, including: simplicity of construction and assembly, excellent and optimal operational characteristics due to an efficient single stage vortex, improved pollutant reduction because of provision for a reaction volume between the catalytic converter heater and the catalytic converter, and universal mounting which allows for easy removal and replacement should the need of servicing occur.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An exhaust system for an internal combustion engine comprising:

exhaust pipe means for receiving exhaust gas from an internal combustion engine;

catalytic converter means connected with said exhaust pipe means for catalytically removing selected pollutants from the exhaust gas;

a fitting connected with said exhaust pipe means upstream of said catalytic converter means; and a catalytic converter heater comprising:

an air chamber housing having an air chamber thereinside;

means for connecting a source of pressurized air to said air chamber;

a combustion chamber housing having a first end, a second end and an external surface therebetween, said combustion chamber housing having a combustion chamber therewithin, said combustion chamber housing having at least one aperture formed therein remote from said first end thereof;

means for connecting said combustion chamber housing to said air chamber housing;

a single-stage vortex located in said first end of said combustion chamber housing, said vortex having a perimeter and a vortex opening centrally disposed with respect to said perimeter, said vortex having vane means for inducing swirling movement of air passing therethrough from said perimeter to said vortex opening, said vane means forming a mixing chamber coaxial with respect to said vortex opening;

fuel nozzle assembly means for providing connection to a source of fuel, for providing atomization of fuel from the source of fuel, and for providing an orifice for emission of the atomized fuel into said mixing chamber;

combustion air passage means for providing a first air passage between said air chamber and said vortex adjacent to said vane means and said perimeter thereof;

dilution air passage means for providing a second air passage between said air chamber and an area adjacent to said external surface of said combustion chamber housing;

ignition means located in said combustion chamber housing for providing selective ignition of an air-fuel mist; and mounting flange means connected with said air chamber housing for providing selectively removable connection thereof to said fitting of said exhaust system means;

wherein a combustion air portion of pressurized air within said air chamber passes through said combustion air passage means, through said vane means into said mixing chamber whereupon the combustion air mixes with atomized fuel emitted from said orifice to thereby form the air-fuel mist, the air-fuel mist then passes through said vortex opening into said combustion chamber whereupon the air-fuel mist is ignited by said ignition means, wherein heater combustion gas formed from combustion of the air-fuel mist is released into exhaust gas of the exhaust system through said at least one aperture in said combustion chamber housing;

wherein a dilution air portion of the pressurized air within said air chamber passes through said dilution air passage means, passes alongside said external surface of said combustion chamber, and thereupon mixes with said heater combustion gas and the exhaust gas; and wherein said upstream location of said fitting with respect to said catalytic converter means provides a reaction volume in said exhaust pipe means between said catalytic converter heater and said catalytic converter means for providing oxidation of said selected pollutants with oxygen of said dilution air in advance of entry thereof into said catalytic converter means;

wherein said vortex further comprises a base component having a first side and a second side, said first side thereof having a frustoconical outlet communicating with said vortex opening; and a vane component comprising said vane means, said vane component being integrally connected with said first side of said base component, said vane means comprising a plurality of vanes having a pinwheel configuration situated between said vortex opening and said perimeter;

wherein said fuel nozzle assembly comprises a nozzle holder having a fuel passage formed therewithin, said nozzle holder having an end structured to connect to the source of fuel; and a nozzle body connected with said nozzle holder, said nozzle body comprising fuel atomization means communicating with said fuel passage for atomizing fuel from the source of fuel and emitting the atomized fuel at said orifice into said mixing chamber;

wherein said fuel atomization means comprises a pocket formed in said nozzle body, said pocket having a floor, said orifice being formed in said floor;

a fuel director located in said pocket, said fuel director having a cylindrical segment and a triangular segment, said triangular segment having three sides and three radiused corners, said radiused corners providing shelves with respect to said cylindrical segment, said triangular segment having a foot end abutting said floor, said foot end having a cylindrical sink formed therein, said foot further having a plurality of grooves formed therein extending from said sides to said cylindrical sink; and a spring extending from said nozzle holder to said shelves of said fuel director.

2. The exhaust system of claim 1, wherein said nozzle body comprises:

an annular flange portion having an upstream side and a downstream side, said upstream side of said annular flange portion sealingly engaging said air chamber housing, said downstream side of said annular flange portion sealingly engaging said combustion chamber housing; and a central portion integrally connected with said annular flange portion, said central portion sealingly receiving said nozzle holder means, said fuel atomization means being located in said central portion.

3. The exhaust system of claim 2, wherein said combustion air passage means and said dilution air passage means comprise:

a plurality of regularly spaced, curved combustion air holes formed in said annular flange portion; and a plurality of regularly spaced dilution air holes formed in said annular flange portion.

4. The exhaust system of claim 3, wherein said at least one aperture comprises at least one selected from the group consisting of: an aperture formed in said second end of said combustion chamber, a plurality of holes formed in said combustion chamber, a plurality of louvers formed in said combustion chamber, and a combination thereof.

5. A catalytic converter heater for heating exhaust gas of an exhaust system of an internal combustion engine comprising a heater upstream of a catalytic converter of the exhaust system, said heater comprising:

an air chamber housing having an air chamber thereinside;

means for connecting a source of pressurized air to said air chamber;

a combustion chamber housing having a first end, a second end and an external surface therebetween, said combustion chamber housing having a combustion chamber therewithin, said combustion chamber housing having at least one aperture formed therein remote from said first end thereof;

means for connecting said combustion chamber housing to said air chamber housing;

a single-stage vortex located in said first end of said combustion chamber housing, said vortex having a perimeter and a vortex opening centrally disposed with respect to said perimeter, said vortex having vane means for inducing swirling movement of air passing therethrough from said perimeter to said vortex opening, said vane means forming a mixing chamber coaxial with respect to said vortex opening;

fuel nozzle assembly means for providing connection to a source of fuel, for providing atomization of fuel from the source of fuel, and for providing an orifice for emission of the atomized fuel into said mixing chamber;

combustion air passage means for providing a first air passage between said air chamber and said vortex adjacent to said vane means and said perimeter thereof;

dilution air passage means for providing a second air passage between said air chamber and an area adjacent to said external surface of said combustion chamber housing;

ignition means located in said combustion chamber housing for providing selective ignition of an air-fuel mist; and mounting flange means connected with said air chamber housing for providing selectively removable connection thereof to a fitting of an exhaust system;

wherein a combustion air portion of pressurized air within said air chamber passes through said combustion air passage means, through said vane means into said mixing chamber whereupon the combustion air mixes with atomized fuel emitted from said orifice to thereby form the air-fuel mist, the air-fuel mist then passes through said vortex opening into said combustion chamber whereupon the air-fuel mist is ignited by said ignition means, wherein heater combustion gas formed from combustion of the air-fuel mist is released into exhaust gas of the exhaust system through said at least one aperture in said combustion chamber housing; and wherein a dilution air portion of the pressurized air within said air chamber passes through said dilution air passage means, passes alongside said external surface of said combustion chamber, and thereupon mixes with said heater combustion gas and the exhaust gas;

wherein said vortex further comprises a base component having a first side and a second side, said first side thereof having a frustoconical outlet communicating with said vortex opening; and a vane component comprising said vane means, said vane component being integrally connected with said first side of said base component, said vane means comprising a plurality of vanes having a pinwheel configuration situated between said vortex opening and said perimeter;

wherein said fuel nozzle assembly comprises a nozzle holder having a fuel passage formed therewithin, said nozzle holder having an end structured to connect to the source of fuel; and a nozzle body connected with said nozzle holder, said nozzle body comprising fuel atomization means communicating with said fuel passage for atomizing fuel from the source of fuel and emitting the atomized fuel at said orifice into said mixing chamber;

wherein said fuel atomization means comprises a pocket formed in said nozzle body, said pocket having a floor, said orifice being formed in said floor;

a fuel director located in said pocket, said fuel director having a cylindrical segment and a triangular segment, said triangular segment having three sides and three radiused corners, said radiused corners providing shelves with respect to said cylindrical segment, said triangular segment having a foot end abutting said floor, said foot end having a cylindrical sink formed therein, said foot further having a plurality of grooves formed therein extending from said sides to said cylindrical sink; and a spring extending from said nozzle holder to said shelves of said fuel director.

6. The catalytic converter heater of claim 1, wherein said nozzle body comprises:

an annular flange portion having an upstream side and a downstream side, said upstream side of said annular flange portion sealingly engaging said air chamber housing, said downstream side of said annular flange portion sealingly engaging said combustion chamber housing; and a central portion integrally connected with said annular flange portion, said central portion sealingly receiving said fuel nozzle holder means, said fuel atomization means being located in said central portion.

7. The catalytic converter heater of claim 6, wherein said combustion air passage means and said dilution air passage means comprise:

a plurality of regularly spaced, curved combustion air holes formed in said annular flange portion; and a plurality of regularly spaced dilution air holes formed in said annular flange portion.

8. The catalytic converter heater of claim 7, wherein said air chamber housing comprises:

an enclosure, said air chamber being located within said enclosure; and a casing integrally connected with said enclosure, said casing being coaxial with respect to said first end of said combustion chamber housing;

wherein an annular offset is formed in said air chamber housing at said connection of said enclosure to said casing.

9. The catalytic converter heater of claim 8, wherein said means for connecting said combustion chamber housing to said air chamber housing comprises:

means for connecting said nozzle holder to said enclosure so that said annular flange portion sealingly engages said annular offset of said air chamber housing;

means for connecting said vortex to said annular flange portion so that said vane means adjoins said downstream side of said annular flange portion; and means for connecting said annular flange portion and said vortex to said first end of said combustion chamber housing.

10. The catalytic converter heater of claim 9, wherein said at least one aperture comprises at least one selected from the group consisting of: an aperture formed in said second end of said combustion chamber, a plurality of holes formed in said combustion chamber, a plurality of louvers formed in said combustion chamber, and a combination thereof.

11. A catalytic converter heater for heating exhaust gas of an exhaust system of an internal combustion engine comprising a heater upstream of a catalytic converter of the exhaust system, said heater comprising:

an air chamber housing having an air chamber thereinside;

a source of pressurized air connected to said air chamber;

means for selectively actuating said source of pressurized air and for selectively isolating said source of pressurized air from said air chamber;

a combustion chamber housing having a first end, a second end and an external surface therebetween, said combustion chamber housing having a combustion chamber therewithin, said combustion chamber housing having at least one aperture formed therein remote from said first end thereof;

means for connecting said combustion chamber housing to said air chamber housing;

a single-stage vortex located in said first end of said combustion chamber housing, said vortex having a perimeter and a vortex opening centrally disposed with respect to said perimeter, said vortex having vane means for inducing swirling movement of air passing therethrough from said perimeter to said vortex opening, said vane means forming a mixing chamber coaxial with respect to said vortex opening;

means for providing a source of fuel;

fuel nozzle assembly means connected to said source of fuel for providing atomization of fuel from the source of fuel and for providing an orifice for emission of the atomized fuel into said mixing chamber;

means for selectively purging said fuel from said fuel nozzle assembly;

combustion air passage means for providing a first air passage between said air chamber and said vortex adjacent to said vane means and said perimeter thereof;

dilution air passage means for providing a second air passage between said air chamber and an area adjacent to said external surface of said combustion chamber housing;

ignition means located in said combustion chamber housing for providing selective ignition of an air-fuel mist; and mounting flange means connected with said air chamber housing for providing selectively removable connection thereof to a fitting of an exhaust system;

wherein a combustion air portion of pressurized air within said air chamber passes through said combustion air passage means, through said vane means into said mixing chamber whereupon the combustion air mixes with atomized fuel emitted from said orifice to thereby form the air-fuel mist, the air-fuel mist then passes through said vortex opening into said combustion chamber whereupon the air-fuel mist is ignited by said ignition means, wherein heater combustion gas formed from combustion of the air-fuel mist is released into exhaust gas of the exhaust system through said at least one aperture in said combustion chamber housing; and wherein a dilution air portion of the pressurized air within said air chamber passes through said dilution air passage means, passes alongside said external surface of said combustion chamber, and thereupon mixes with said heater combustion gas and the exhaust gas;

wherein said vortex further comprises a base component having a first side and a second side, said first side thereof having a frustoconical outlet communicating with said vortex opening; and a vane component comprising said vane means, said vane component being integrally connected with said first side of said base component, said vane means comprising a plurality of vanes having a pinwheel configuration situated between said vortex opening and said perimeter;

wherein said fuel nozzle assembly comprises a nozzle holder having a fuel passage formed therewithin, said nozzle holder having an end structured to connect to the source of fuel; and a nozzle body connected with said nozzle holder, said nozzle body comprising fuel atomization means communicating with said fuel passage for atomizing fuel from the source of fuel and emitting the atomized fuel at said orifice into said mixing chamber; wherein said fuel atomization means comprises:

a pocket formed in said nozzle body, said pocket having a floor, said orifice being formed in said floor;

a fuel director located in said pocket, said fuel director having cylindrical segment and a triangular segment, said triangular segment having three sides and three radiused corners, said radiused corners providing shelves with respect to said cylindrical segment, said triangular segment having a foot end abutting said floor, said foot end having a cylindrical sink formed therein, said foot further having a plurality of grooves formed therein extending from said sides to said cylindrical sink; and a spring extending from said nozzle holder to said shelves of said fuel director.

* * * * *